UNITED STATES PATENT OFFICE.

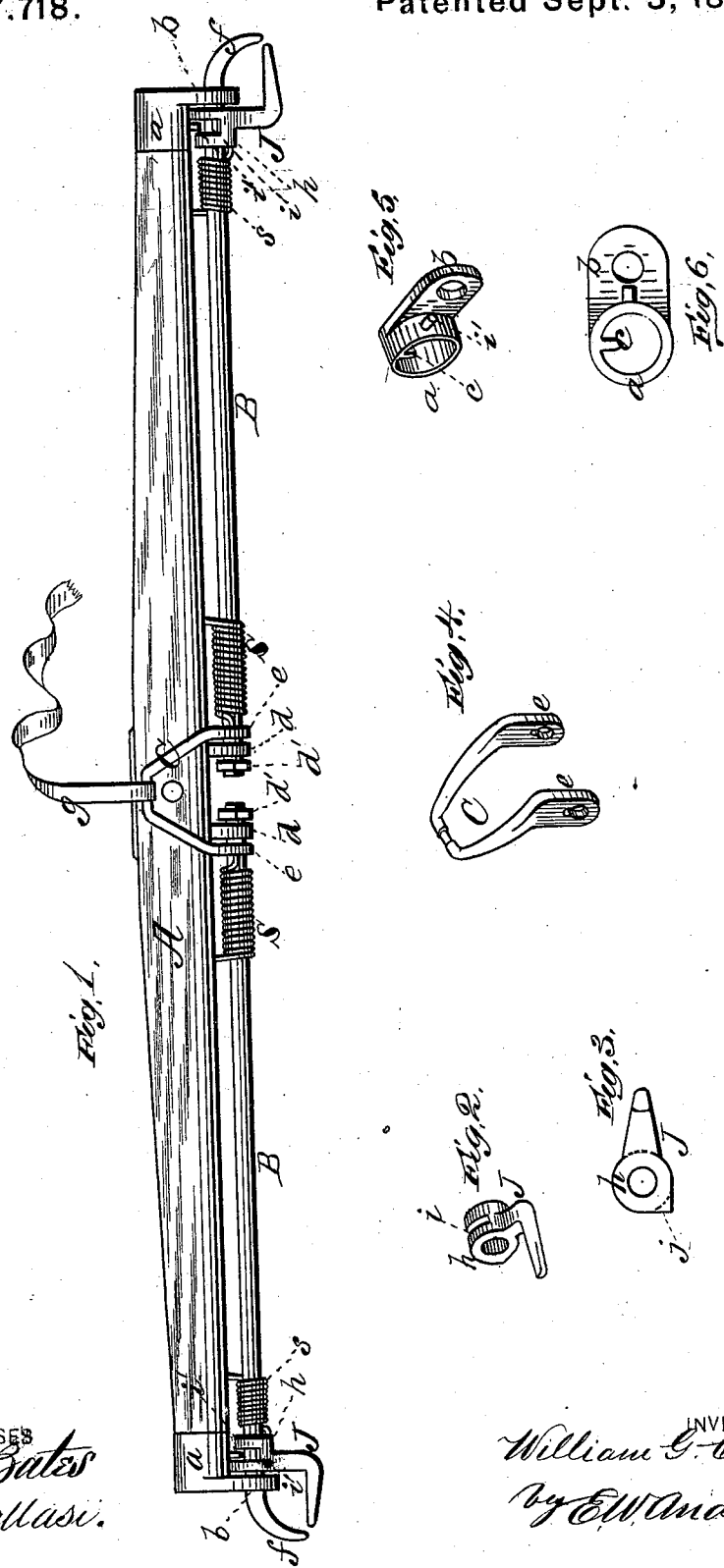

WILLIAM G. CUMMINS, OF COOKVILLE, TENNESSEE.

IMPROVEMENT IN HORSE-DETACHERS.

Specification forming part of Letters Patent No. 207,718, dated September 3, 1878; application filed July 27, 1878.

*To all whom it may concern:*

Be it known that I, WILLIAM G. CUMMINS, of Cookville, in the county of Putnam and State of Tennessee, have invented a new and valuable Improvement in Releasing-Whiffletrees; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a bottom view of my improved releasing single-tree, and Figs. 2, 3, 4, 5, 6 are details.

This invention has relation to improvements in horse-detachers; and it consists in the combination, with a single-tree having ferrules at its ends, provided with bearing-arms and eyebolts at each side of its center, of the independent rotating trace-hook rods, having their bearings in said arms and bolts, a bail uniting the ends of said rods, a draw-cord attached to said bail and reaching into the vehicle, and returning-springs secured at one end to the tree and at the other to the bail.

It also consists in combining a single-tree, independent trace-rod hooks journaled thereon, a bail uniting the inner ends of said rods, and returning-springs with guards rotating independently on said rods and closing the hooks, and their returning-springs, substantially as specified hereinafter.

In the annexed drawings, the letter A designates an ordinary single-tree, in connection with which I shall illustrate my invention. At each end of the single-tree is applied a ferrule, $a$, having an internal rib, $c$, and a projecting arm or wing, $b$, in which the outer end of the trace-hook rod B has its bearing. The extremity of this single-tree is grooved to receive the rib $c$ of the ferrule, which is thus prevented from rotation or turning.

The rods B are two in number, and have their inner bearings in eyebolts $d$, projecting from the tree at each side of the center. The inner ends of these rods are connected together by means of a strong metallic bail, C, bent to conform to the shape of the tree, and extending over the top of the same to its front edge, and the rods are prevented from outward endwise displacement by means of a nut, $d'$, applied upon their ends projecting through the eyebolts $d$ aforesaid. As shown in Fig. 1, the said eyebolts are included between the nuts $d'$ and the ends $e$ of the bail C, and this latter, as well as the said nuts, being fixed on the said rods, they are locked against all endwise displacement.

The hooks $f$ of the trace-rods B are bent to the rear in an easy curve, and serve to receive the cock-eye on the end of the trace; but when the said rods are turned half round the ends of the hooks point forward, and the traces easily slip off from them and detach the horse from the tree. This is accomplished by means of a cord, $g$, secured to the bail and reaching into the vehicle. After being turned, as above set forth, the rods B are returned to their original positions by means of the coiled springs S, rigidly secured at their outer ends to the tree and at their inner ends to the arms $e$ of the bail, being prevented from undue backward rotation by the abutting of the bail against the under side of the tree.

J indicates angular metallic guards, provided with a hub, $h$, and rotating freely on the rods B. The extremity of this guard forms, with the trace-hook $f$, nearly a junction, and the under side of its hub $h$ is provided with a groove, $i$, in which is engaged a stop-pin, $i'$, projecting from the ferrules, and limiting the rotation of the said guards to an arc of forty-five degrees. This guard serves to prevent the trace from being disengaged from the hook in going downhill, backing the vehicle, and under other circumstances, but is readily swung out of the way of the said hook for the purpose of attaching the trace thereto or unhooking it therefrom. This device is maintained in position for keeping the trace-eye to its engagement with the hook by means of a spring, $s$, coiled around the rods B, and secured at one end to the guard and at the other to the tree, as shown. These guards are independent of each other and of the hooks, and in hitching up the horse to the vehicle or taking him out therefrom are separately turned to attach the trace to or detach the same from the single-tree. Upon its return the guard is held against rotating beyond its guarding position by means of the pin $i'$ and the shoulder $j$ at the end of slot $i$.

What I claim as new, and desire to secure by Letters Patent, is—

1. The combination, with the single-tree A, having ferrules a, provided with bearing-arms b and eyebolts d, of the independent rotating trace-hook rods B, the bail C, uniting said rods, the draw-cord g, and returning-springs S, secured at one end to the bail and at the other to the tree and coiled around said rods, substantially as specified.

2. The combination, with the single-tree A, independent rotating trace-hook rods B, journaled thereon, bail C, uniting said rods, a draw-cord, g, and returning-springs S, of the angular metallic guards J, rotating independently on said rods, and forming a closed loop with the trace-hooks f, and the spring s, substantially as specified.

3. The combination, with the single-tree A, independent rotating rods B, having hooks f, bail C, uniting said rods, and the returning-springs S, of the angular guards J, having grooved hub h, a pin, i', projecting from the ferrule a, and springs s, secured at one end to the guard and at the other to the tree, substantially as specified.

In testimony that I claim the above I have hereunto subscribed my name in the presence of two witnesses.

WILLIAM G. CUMMINS.

Witnesses:
HUGH H. LANSDEN,
ROBERT W. RICE.